(12) United States Patent
Kamata et al.

(10) Patent No.: US 8,305,022 B2
(45) Date of Patent: Nov. 6, 2012

(54) MOTOR CONTROL DEVICE AND MOTOR SYSTEM

(75) Inventors: Yuki Kamata, Fujisawa (JP); Sadao Ikeda, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 431 days.

(21) Appl. No.: 12/686,621

(22) Filed: Jan. 13, 2010

(65) Prior Publication Data

US 2010/0231154 A1    Sep. 16, 2010

(30) Foreign Application Priority Data

Mar. 12, 2009    (JP) .................................. 2009-59228

(51) Int. Cl.
  *H02K 29/06*    (2006.01)
(52) U.S. Cl. ............... 318/400.32; 318/400.23; 318/563
(58) Field of Classification Search ............ 318/400.32, 318/400.23, 563, 603, 571, 599, 811, 494, 318/400.35, 400.01, 400.34, 400.4
See application file for complete search history.

(56) References Cited

U.S. PATENT DOCUMENTS

| | | | |
|---|---|---|---|
| 7,560,886 B2 | 7/2009 | Kaneko et al. | |
| 7,821,282 B2 | 10/2010 | Kurahashi et al. | |
| 7,928,675 B2 | 4/2011 | Chen | |

FOREIGN PATENT DOCUMENTS

| | | |
|---|---|---|
| JP | 05-344779 | 12/1993 |
| JP | 2003-033075 | 1/2003 |
| JP | 2003033075 | 1/2003 |
| JP | 2004-096933 | 3/2004 |
| JP | 2005-192335 | 7/2005 |

OTHER PUBLICATIONS

Japanese Office Action for Japanese Patent Application No. 2009-059228 mailed on Jul. 26, 2011.
Japanese Office Action for Japanese Patent Application No. 2009-059228 mailed on May 22, 2012.

*Primary Examiner* — Karen Masih
(74) *Attorney, Agent, or Firm* — Turocy & Watson, LLP (57) ABSTRACT

A motor control device has first to third amplifiers which amplify voltage generated at first to third shunt resistances connected to first to third drivers to supply driving current of each of three phases to a three-phase brushless motor, first to third sample-hold circuits which sample and hold voltage amplified by the first to third amplifiers, a multiplexer which sequentially selects and outputs voltage values held by the first to third sample-hold circuits, an A/D converter which performs A/D conversion on output signals of the multiplexer, and an arithmetic unit which calculates the driving current through an output signal of the A/D converter, estimates a magnetic pole position of the motor based on the driving current, and performs pulse width modulation (PWM) control on the driving current by controlling the first to third drivers.

20 Claims, 12 Drawing Sheets

MOTOR CONTROL DEVICE AND MOTOR SYSTEM

CROSS REFERENCE TO RELATED APPLICATIONS

This application is based upon and claims benefit of priority from the Japanese Patent Application No. 2009-59228, filed on Mar. 12, 2009, the entire contents of which are incorporated herein by reference.

BACKGROUND OF THE INVENTION

The present invention relates to a motor control device and a motor system.

Brushless motors which are popularly utilized as motors of electrical equipments have been operated with pulse width modulation (PWM) sine-waves for wide-range variable speed control and power consumption reduction. In addition, for the sake of cost reduction and miniaturization, sensorless operation has been performed while detecting the rotation position of the brushless motor without utilizing a position sensor such as a Hall element.

It has been known that an arithmetic process of current control and an arithmetic process of magnetic pole position estimation are alternately performed every half period by dividing PWM carrier waves (for example, see JP-A 2003-33075 (KOKAI)). Motor current information is utilized for these arithmetic processes. The motor current information is acquired by performing A/D conversion on voltage generated at a shunt resistance.

For example, a three-shunt type has A/D converters corresponding to each of U-phase, V-phase and W-phase. Since the voltage generated at the shunt resistance is possible to be acquired only when a lower switch of a driver of each of the three phases is kept ON, the A/D converters are required to perform A/D conversion within a short time of the order of several micro seconds. For example, in a case that the PWM switching frequency is 18 kHz and the duty is 90%, the OFF time of the lower switch is 5 μs. Accordingly, three channels of high-speed A/D converters are to be arranged and a problem of increasing a circuit area has occurred.

Further, it is known to configure to arrange one channel of the A/D converter and to provide shunt resistance voltage of each phase to the A/D converter with switching by a multiplexer. With this configuration, the A/D converter performs A/D conversion within a short time when the driver lower switch of each of three phases is kept ON while the shunt resistance voltage for three phases is switched by the multiplexer. Therefore, the A/D converter is required to perform A/D conversion in extremely high speed and a problem of increasing cost occurs.

SUMMARY OF THE INVENTION

According to one aspect of the present invention, there is provided a motor control device, comprising:
first to third amplifiers which amplify voltage generated at first to third shunt resistances connected to first to third drivers to supply driving current of each of three phases to a three-phase brushless motor;
first to third sample-hold circuits which sample and hold voltage amplified by the first to third amplifiers;
a multiplexer which sequentially selects and outputs voltage values held by the first to third sample-hold circuits;
an A/D converter which performs A/D conversion on output signals of the multiplexer; and
an arithmetic unit which calculates the driving current through an output signal of the A/D converter, estimates a magnetic pole position of the motor based on the driving current, and performs pulse width modulation (PWM) control on the driving current by controlling the first to third drivers.

According to one aspect of the present invention, there is provided a motor control device, comprising:
an amplifier which amplifies voltage generated at a shunt resistance connected to first to third drivers to supply driving current of each of three phases to a three-phase brushless motor;
first and second sample-hold circuits which sample and hold voltage amplified by the amplifier;
a multiplexer which sequentially selects and outputs voltage values held by the first and second sample-hold circuits;
an A/D converter which performs A/D conversion on output signals of the multiplexer; and
an arithmetic unit which calculates the driving current through an output signal of the A/D converter, estimates a magnetic pole position of the motor based on the driving current, and performs PWM control on the driving current by controlling the first to third drivers.

According to one aspect of the present invention, there is provided a motor system, comprising:
a rotor which includes a permanent magnet;
a stator which is arranged being opposed to the rotor and includes first to third coils connected being star-shaped;
first to third drivers which supply driving current to the first to third coils;
at least one shunt resistance which is connected to the first to third drivers;
at least one amplifier which amplifies voltage generated at the shunt resistance;
a plurality of sample-hold circuits which sample and hold voltage amplified by the amplifier;
a multiplexer which sequentially selects and outputs voltage values held by the plurality of sample-hold circuits;
an A/D converter which performs A/D converter on output signals of the multiplexer; and
an arithmetic unit which calculates the driving current through an output signal of the A/D converter, estimates a position of the rotor based on the driving current, and performs PWM control on the driving current by controlling the first to third drivers.

DETAILED DESCRIPTION OF THE INVENTION

Hereafter, embodiments of the present invention will be described with reference to the drawings.

First Embodiment

Figure 1:
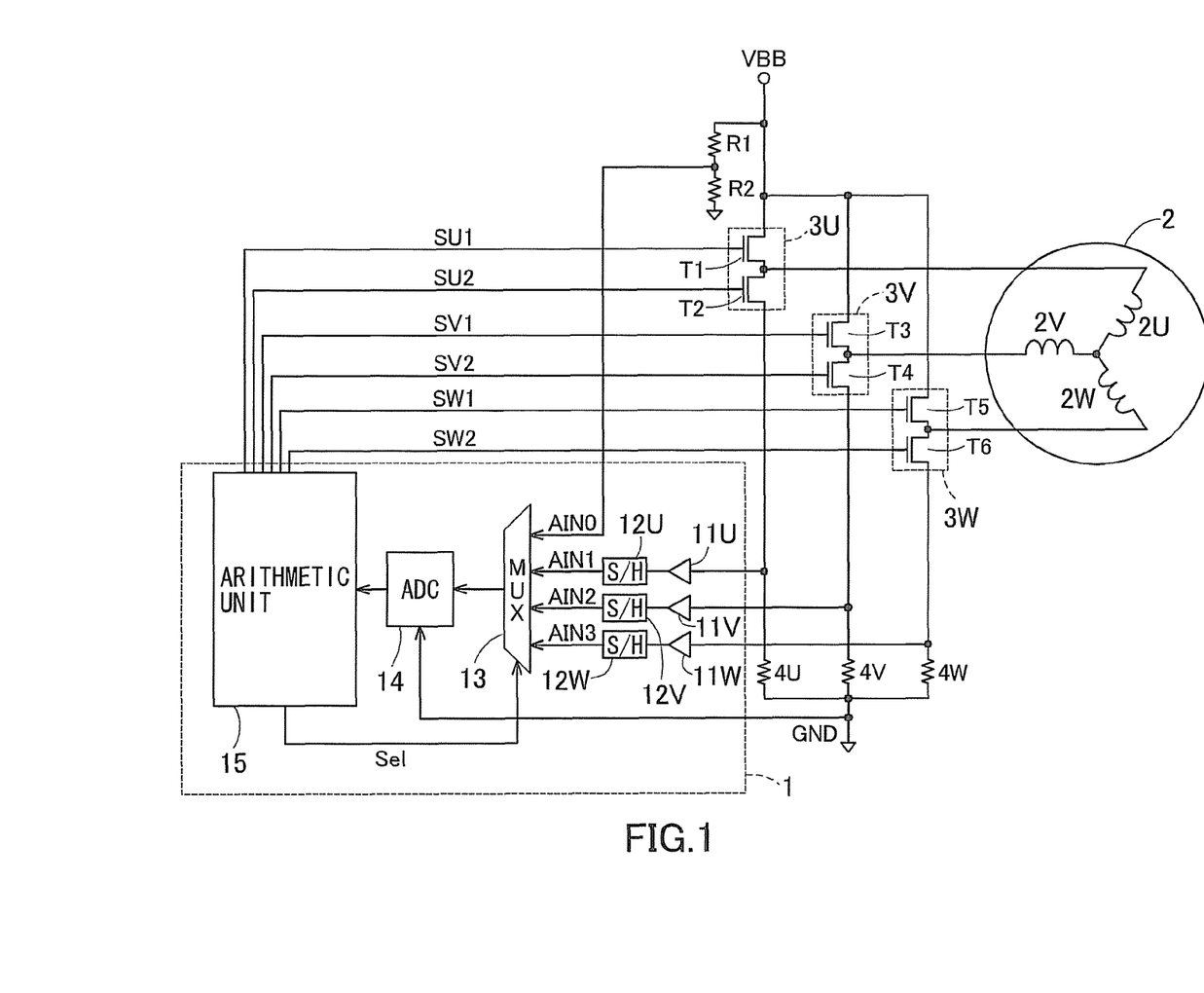
FIG. 1 is a schematic structural view of a motor system according to a first embodiment of the present invention.

FIG. 1 shows a schematic configuration of a motor system including a motor control device 1 and a motor 2 as an object to be controlled according to the first embodiment of the present invention. In the present embodiment, the motor 2 is a three-phase brushless motor which includes a stator having star-connected coils 2U, 2V, and 2W and a rotor (not illustrated) formed of a permanent magnet. The coils 2U, 2V, and 2W respectively correspond to U-phase, V-phase and W-phase.

Output terminals of drivers (i.e., inverters) 3U, 3V, and 3W to supply driving current to the motor 2 are respectively connected to one end of each of the coils 2U, 2V, and 2W. The drivers 3U, 3V, and 3W receive source voltage VBB at one end and are grounded respectively via shunt resistances 4U, 4V, and 4W at the other end.

The driver 3U has serially-connected transistors T1 and T2. The driver 3V has serially-connected transistors T3 and T4. The driver 3W has serially-connected transistors T5 and T6. Further, the transistors T1 to T6 are respectively provided with a reflux diode (not illustrated) which is parallel-connected thereto. Here, the reflux diode can be eliminated by utilizing a parasitic diode of each transistor.

The motor control device 1 acquires motor current information from the voltage generated at the shunt resistances 4U, 4V, and 4W. The motor control device 1 estimates the rotor position by utilizing the motor current information and generates PWM signals SU1, SU2, SV1, SV2, SW1, and SW2 to perform PWM control on the voltage to be applied to the motor 2.

Switching is performed by providing PWM signals SU1, SU2, SV1, SV2, SW1, and SW2 respectively to gate electrodes of the transistors T1 to T6, so that the driving current to be supplied to the motor 2 is generated.

The motor control device 1 includes amplifiers 11U, 11V, 11W, sample-hold circuits 12U, 12V, 12W, a multiplexer 13, an A/D converter 14 and an arithmetic unit 15.

The amplifiers 11U, 11V, and 11W respectively perform level-shift on the motor current converted at the shunt resistances 4U, 4V, and 4W into the voltage of 0 V basis toward 2.5 V basis, and then, amplify voltage amplitude.

The sample-hold circuits 12U, 12V, and 12W respectively sample and hold the voltage amplified by the amplifiers 11U, 11V, and 11W. The sample-hold circuits 12U, 12V, and 12W perform the sampling based on control signals outputted from the arithmetic unit 15. The sample-hold circuits 12U, 12V, and 12W are respectively formed with a capacitor to hold voltage, a switch and a buffer amplifier, for example.

The multiplexer 13 is provided with a voltage value AIN0 being a divided value of the source voltage VBB by resistances R1, and R2 and voltage values AIN1, AIN2, and AIN3 held by the sample-hold circuits 12U, 12V, and 12W. The multiplexer 13 selects one of the voltage values AIN0 to AIN3 based on a selection signal Sel outputted from the arithmetic unit 15 and outputs the selected voltage value to the A/D converter 14. The information corresponding to U-phase, V-phase and W-phase is respectively selected for each phase and outputted to the A/D converter 14.

The A/D converter 14 performs A/D conversion on the output signal of the multiplexer 13 and outputs the converted output signal to the arithmetic unit 15.

Figure 2:
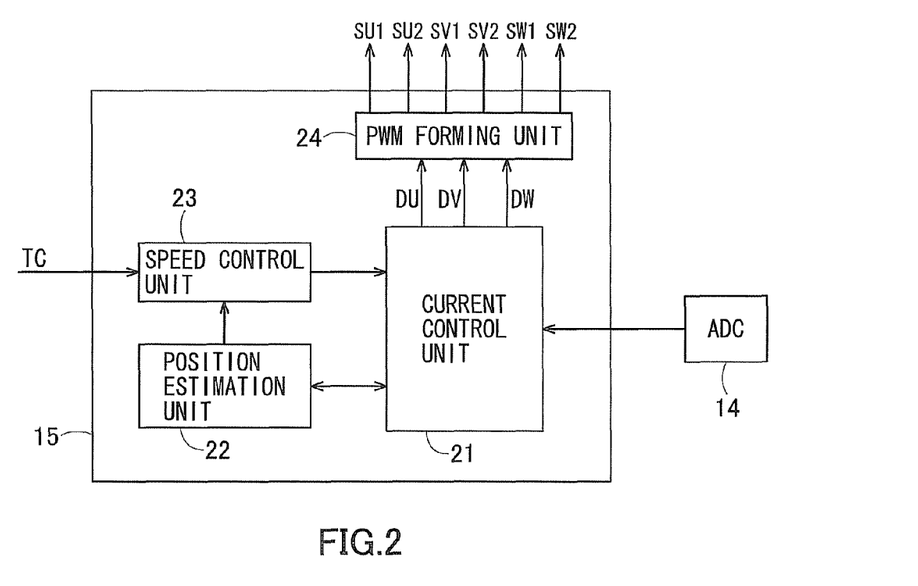
FIG. 2 is a schematic structural view of an arithmetic unit according to the first embodiment.

A configuration example of the arithmetic unit 15 is shown in FIG. 2. The arithmetic unit 15 includes a current control unit 21, a position estimation unit 22, a speed control unit 23 and a PWM forming unit 24.

The current control unit 21 performs vector resolution into a d-axis direction and a q-axis direction on the three-phase motor current information sequentially outputted from the A/D converter 14. The d-axis direction is a flux direction and the q-axis direction is a direction electrically orthogonal to the d-axis, so that the d-q-axes constitute a rotation coordinate system.

Further, the current control unit 21 generates powering signals DU, DV, and DW at 120° intervals by utilizing a d-axis current command and a q-axis current command which are outputted from the speed control unit 23 and the vector-resolved motor current information.

Further, the current control unit 21 performs sampling control of the sample-hold circuits 12U, 12V, and 12W. Furthermore, the current control unit 21 generates the selection signal Sel.

The position estimation unit 22 estimates angular speed of the rotor by utilizing motor constants such as the vector-resolved motor current information, motor voltage, resistance and inductance. Further, the position estimation unit 22 estimates the rotor position by integrating the estimated angular speed.

The speed control unit 23 generates the d-axis current command and the q-axis current command based on an angular speed corresponding to a torque command TC and the angular speed estimated by the position estimation unit 22.

The PWM forming unit 24 compares the level of PWM carrier waves (i.e., triangular waves) outputted from an internal carrier wave generator and the level of the powering signals DU, DV, and DW respectively, and then, generates the PWM signals SU1, SU2, SV1, SV2, SW1, and SW2 based on the comparison result.

With the above arithmetic unit 15, sine-wave operation of the motor 2 is actualized without a position sensor.

Figure 3:
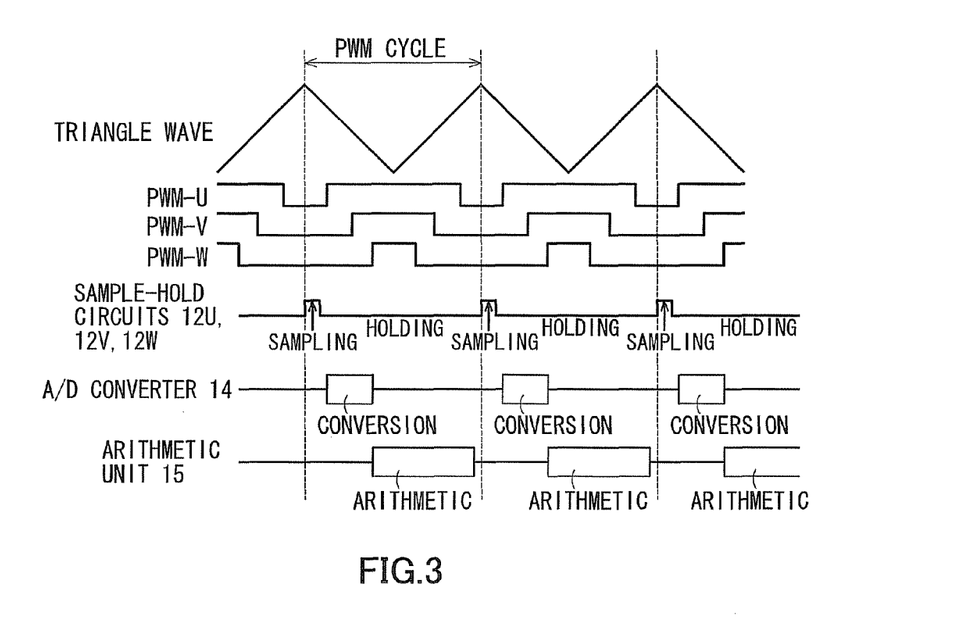
FIG. 3 is a timing chart showing an example of operation of a motor control device according to the first embodiment.

Next, an operation example of each part of the motor control device 1 will be described with reference to a timing chart shown in FIG. 3. The triangle waves indicate the PWM cycle and crest-to-crest (trough-to-trough) thereof corresponds to one period of the PWM.

PWM-U, PWM-V and PWM-W respectively indicate the ON-OFF state of the lower switch (i.e., the transistors T2, T4, and T6) of the drivers 3U, 3V, and 3W. For example, the transistor T2 is kept OFF during the time period in which PWM-U indicates high-level and is kept ON during the time period in which the PWM-U indicates low-level. PWM-V and PWM-W are the same as the above.

The voltage generated at the shunt resistances 4U, 4V, and 4W can be acquired only when the transistors T2, T4, and T6 are kept ON. Accordingly, the sample-hold circuits 12U, 12V, and 12W perform the sampling of the voltage values in synchronization with the crests of the triangle waves.

Subsequently, the voltage values AIN1, AIN2, and AIN3 held by the sample-hold circuits 12U, 12V, and 12W are sequentially selected by the multiplexer 13 and outputted to the A/D converter 14. Incidentally, the voltage value AIN0 is selected once per a plurality of periods.

The A/D converter 14 performs A/D conversion on the voltage values AIN1, AIN2, and AIN3 which are sequentially outputted from the multiplexer 13.

The arithmetic unit 15 performs arithmetic such as the above vector resolution and rotor position estimation by utilizing digital signals outputted from the A/D converter 14. The arithmetic result is reflected to the PWM signals of the next PWM period.

First Comparison Example

Figure 4:
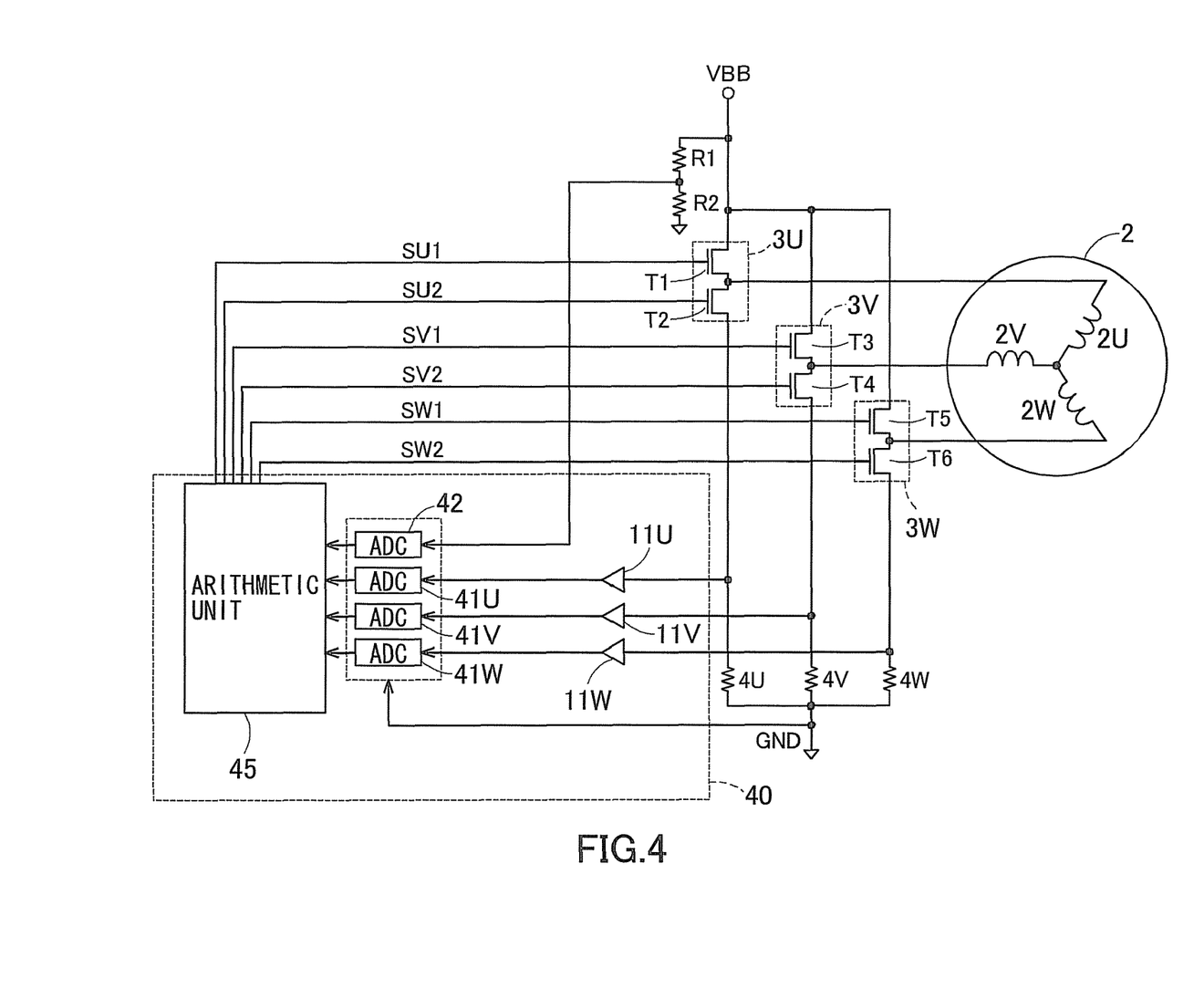
FIG. 4 is a schematic structural view of a motor system according to a first comparison example.

FIG. 4 shows a schematic configuration of a motor control device and a motor as the object to be controlled according to the first comparison example. The same reference numeral is given to the similar structural element of the motor control device and the motor according to the first embodiment shown in FIG. 1 and description thereof will not be repeated.

The motor control device 40 of the first comparison example includes A/D converters 41U, 41V, and 41W corresponding to each of U-phase, V-phase and W-phase and an A/D converter 42 to perform A/D conversion on source voltage information.

Figure 5:
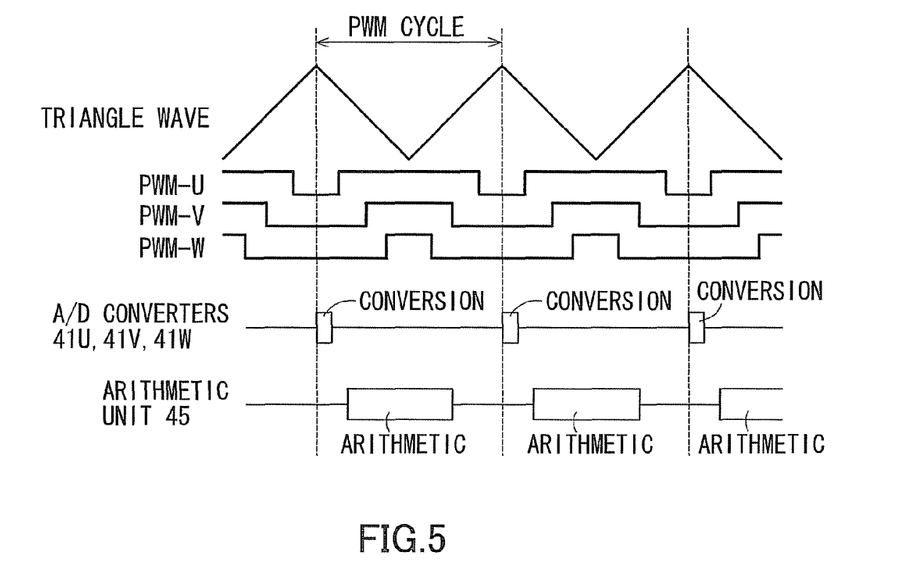
FIG. 5 is a timing chart showing an operation of a motor control device according to the first comparison example.

FIG. 5 shows a timing chart of operation of each part of the motor control device 40. Since the voltage generated at the shunt resistances 4U, 4V, and 4W can be acquired only when all of the transistors T2, T4, and T6 are kept ON, the A/D converters 41U, 41V, and 41W are required to perform A/D conversion within a short time of the order of several micro seconds.

Figure 6:
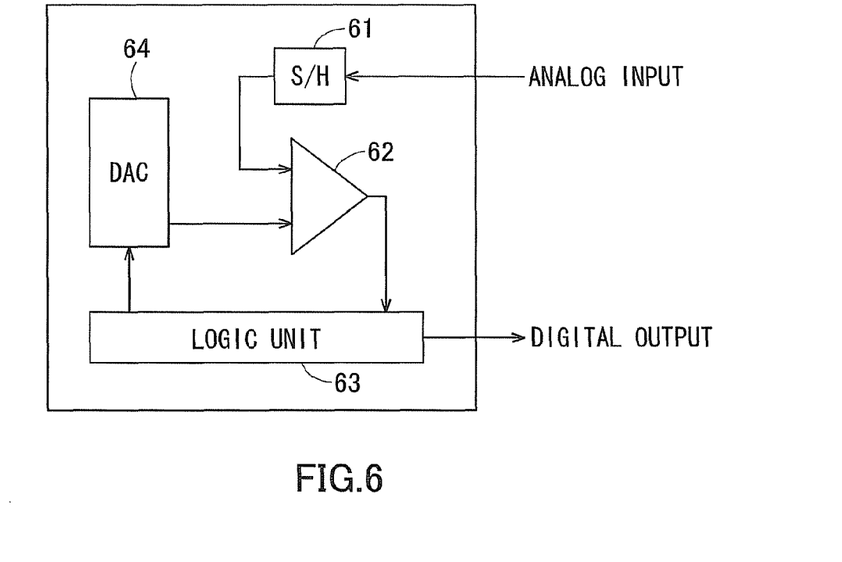
FIG. 6 is a schematic structural view of a successive approximation type A/D converter.

Consequently, the motor control device 40 is to be provided with three channels of high speed A/D converters, so that the circuit area is increased. For example, three channels of successive approximation type A/D converters having a sample-hold circuit 61, a comparator 62, a logic unit 63, and a D/A converter 64 as shown in FIG. 6 are to be provided.

On the other hand, in the first embodiment, the motor control device 1 is configured to include the sample-hold circuits 12U, 12V, and 12W, the multiplexer 13 and the single A/D converter 14. In the motor control device 1, when compared to the motor control device 40, the A/D converter 42 and two each of the comparators 62, the logic units 63 and D/A converters 64 can be eliminated while one each of the multiplexer and the sample-hold circuit is added, as can be seen from FIGS. 1, 4 and 6.

Therefore, the circuit area of the motor control device 1 can be decreased more than that of the motor control device 40 of the first comparison example. Further, in the motor control device 1, since the voltage generated at the shunt resistances is sequentially A/D converted after being sampled by the sample-hold circuits, an A/D converter of lower speed than the A/D converter 41U and the like can be adopted for the A/D converter 14. Consequently, the cost can be decreased.

Second Comparison Example

Figure 7:
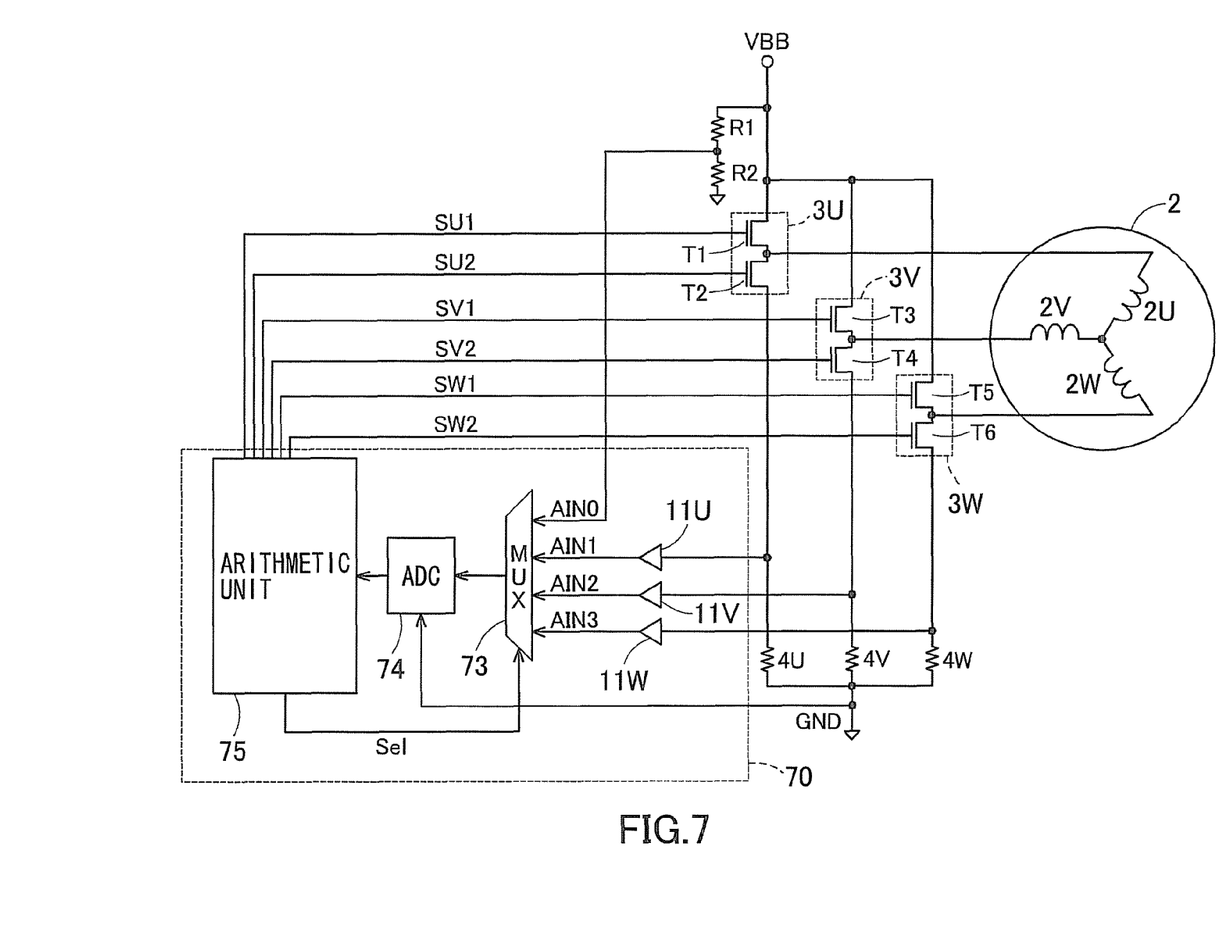
FIG. 7 is a schematic structural view of a motor system according to a second comparison example.

FIG. 7 shows a schematic configuration of a motor control device and a motor as the object to be controlled according, to the second comparison example. The same reference numeral is given to the similar structural element of the motor control device and the motor according to the first embodiment shown in FIG. 1 and description thereof will not be repeated.

The motor control device 70 of the second comparison example is not provided with the sample-hold circuits 12U, 12V, and 12W to perform sampling and holding of the voltage amplified by the amplifiers 11U, 11V, and 11W. A multiplexer 73 sequentially selects and outputs output of the amplifiers 11U, 11V, and 11W.

Figure 8:
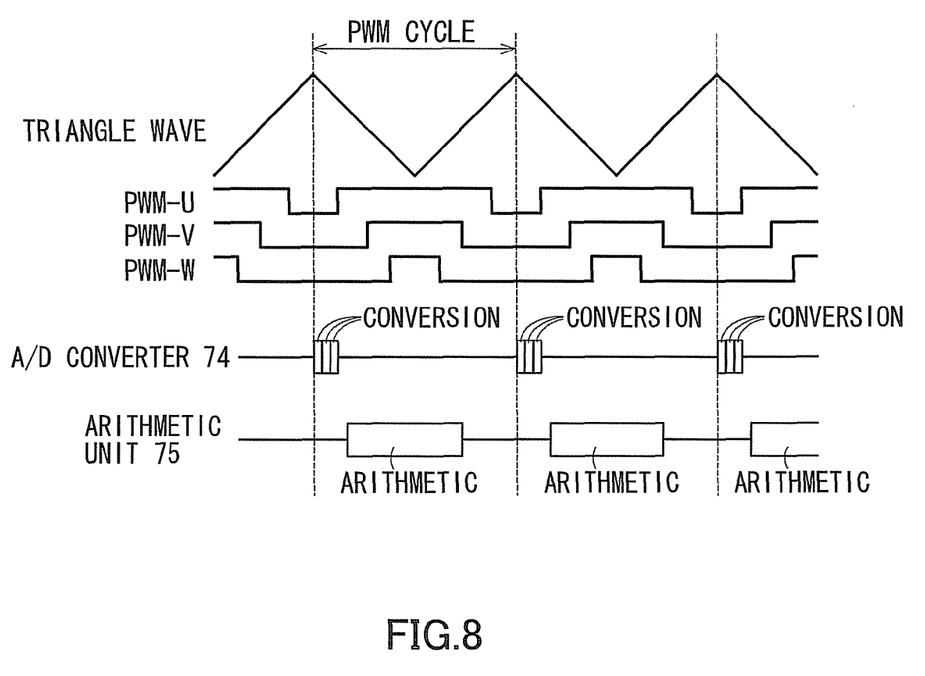
FIG. 8 is a timing chart showing an operation of a motor control device according to the second comparison example.

FIG. 8 shows a timing chart of operation of each part of the above motor control device 70. The voltage generated at the shunt resistances 4U, 4V, and 4W can be acquired only when all of the transistors T2, T4, and T6 are kept ON. Therefore, an A/D converter 74 is required to perform A/D conversion by the amount of three phases within a short time when all of the transistors T2, T4, and T6 are kept ON. Consequently, the A/D converter 74 is to be an A/D converter which can perform A/D conversion in extremely high speed, so that the cost is increased.

On the other hand, in the first embodiment, since the sample-hold circuits 12U, 12V, and 12W hold the information of the voltage generated at the shunt resistances 4U, 4V, and 4W, the A/D conversion can be performed also in a time period that the transistors T2, T4, and T6 are kept OFF. Consequently, an A/D converter of lower speed than the A/D converter 74 can be adopted for the A/D converter 14, so that the cost can be reduced.

In this manner, in the motor control device 1 according to the present embodiment, the sample-hold circuits 12U, 12V, and 12W sample and hold the voltage generated at the shunt resistances 4U, 4V, and 4W. The multiplexer 13 sequentially selects the held voltage information, and then, the A/D converter 14 performs A/D conversion in low speed. Therefore, the circuit area and power consumption can be decreased, so that the cost can be decreased.

Second Embodiment

Figure 9:
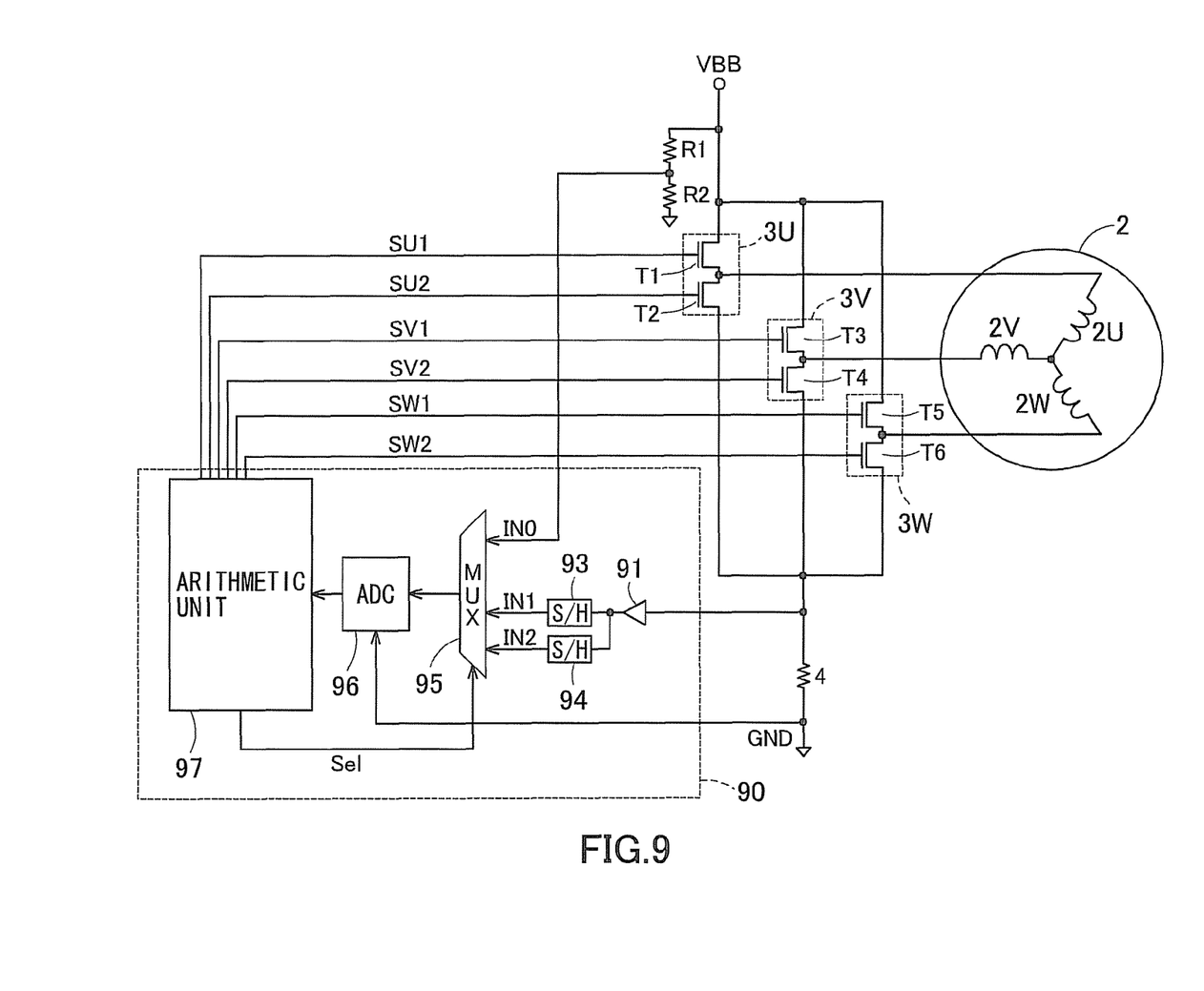
FIG. 9 is a schematic structural view of a motor system according to a second embodiment of the present invention.

FIG. 9 shows a schematic configuration of a motor control device 90 and a motor 2 as the object to be controlled according to the second embodiment. The same reference numeral is given to the similar structural element of the motor control device and the motor according to the first embodiment shown in FIG. 1 and description thereof will not be repeated. The present embodiment adopts a one-shunt type while the first embodiment adopts a three-shunt type.

The motor control device 90 includes an amplifier 91, sample-hold circuits 93, 94, a multiplexer 95, an A/D converter 96 and an arithmetic unit 97.

The amplifier 91 performs the level-shift on the motor current converted at the shunt resistance 4 into the voltage value of 0 V basis toward 2.5 V basis, and then, amplifies the voltage amplitude.

The sample-hold circuits 93 and 94 sample and hold the voltage amplified by the amplifier 91. The sample-hold circuits 93 and 94 perform the sampling based on the control signals outputted from the arithmetic unit 97. For example, the sample-hold circuit 93 samples the total value of the shunt resistance voltage corresponding to V-phase and the shunt resistance voltage corresponding to W-phase, while the sample-hold circuit 94 samples the shunt resistance voltage corresponding to W-phase.

The sample-hold circuits 93 and 94 are respectively formed with a capacitor to hold voltage, a switch and a buffer amplifier, for example.

The multiplexer 95 is provided with a voltage value IN0 being a divided value of the source voltage VBB by resistances R1 and R2 and voltage values IN1 and IN2 held by the sample-hold circuits 93 and 94. The multiplexer 95 selects one of the voltage values IN0 to IN2 based on the selection signal Sel outputted from the arithmetic unit 97 and outputs the selected voltage value to the A/D converter 96.

The A/D converter 96 performs A/D conversion on the output signal of the multiplexer 95 and outputs the converted output signal to the arithmetic unit 97.

The arithmetic unit 97 is configured to be similar to the arithmetic unit 15 according to the first embodiment shown in FIG. 2 and performs vector resolution on the three-phase motor current information, estimation of the rotor position, generation of the PWM signals and the like. The current control unit 21 controls the sample-hold circuits 93 and 94. Further, the current control unit 21 generates the selection signal Sel.

In the present embodiment, the voltage generated at the shunt resistance 4 is sampled by the sample-hold circuits 93 and 94 as the voltage corresponding to respective two phases among three phases of U-phase, V-phase and W-phase. Accordingly, the arithmetic unit 97 acquires the motor current information by the amount of two phases via the multiplexer 95 and the A/D converter 96. In the case of the sine-wave operation, the sum of motor currents of three phases becomes zero. Therefore, when the motor current information for two phases is acquired, it can be calculated for the remaining one phase.

Figure 10:
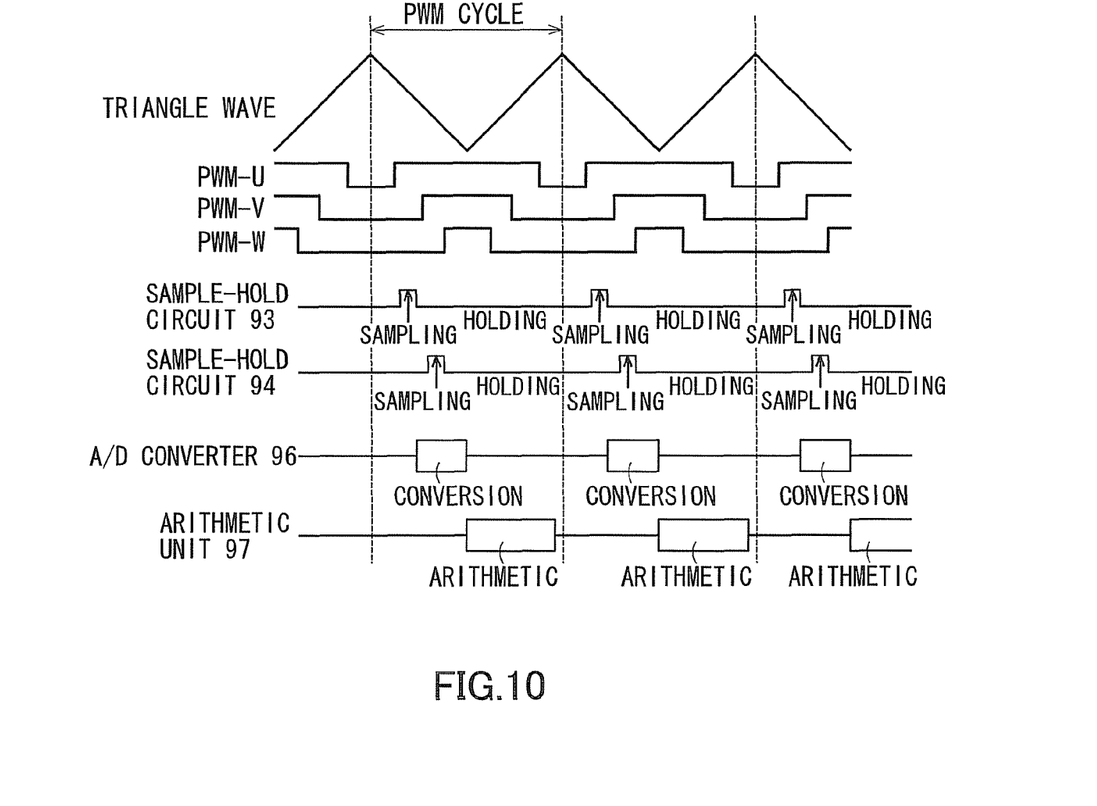
FIG. 10 is a timing chart showing an example of operation of a motor control device according to the second embodiment.

Next, an operation example of each part of the motor control device 90 will be described with reference to a timing chart shown in FIG. 10. The triangle waves indicate the PWM cycle and crest-to-crest (trough-to-trough) thereof corresponds to one period of the PWM.

PWM-U, PWM-V and PWM-W respectively indicate the ON-OFF state of the lower switch (i.e., the transistors T2, T4, and T6) of the drivers 3U, 3V, and 3W. For example, the transistor T2 is kept OFF during the time period in which PWM-U indicates high-level and is kept ON during the time period in which the PWM-U indicates low-level. PWM-V and PWM-W are the same as the above.

The sample-hold circuit 93 performs the sampling when PWM-U is high-level and PWM-V and PWM-W are low-level. Accordingly, the sample-hold circuit 93 samples the total voltage of the shunt resistance voltage corresponding to V-phase and the shunt resistance voltage corresponding to W-phase.

The sample-hold circuit 94 performs the sampling when PWM-U and PWM-V are high-level and PWM-W is low-level. Accordingly, the sample-hold circuit 94 samples the shunt resistance voltage corresponding to W-phase.

Subsequently, the voltage values IN1 and IN2 held by the sample-hold circuits 93 and 94 are sequentially selected by the multiplexer 95 and outputted to the A/D converter 96. Incidentally, the voltage value IN0 is selected once per a plurality of periods.

The A/D converter 96 performs A/D conversion on the voltage values IN1 and IN2 outputted from the multiplexer 95.

The arithmetic unit 97 performs arithmetic such as the above vector resolution and rotor position estimation by utilizing digital signals outputted from the A/D converter 96. The arithmetic result is reflected to the PWM signals of the next PWM period.

Third Comparison Example

Figure 11:
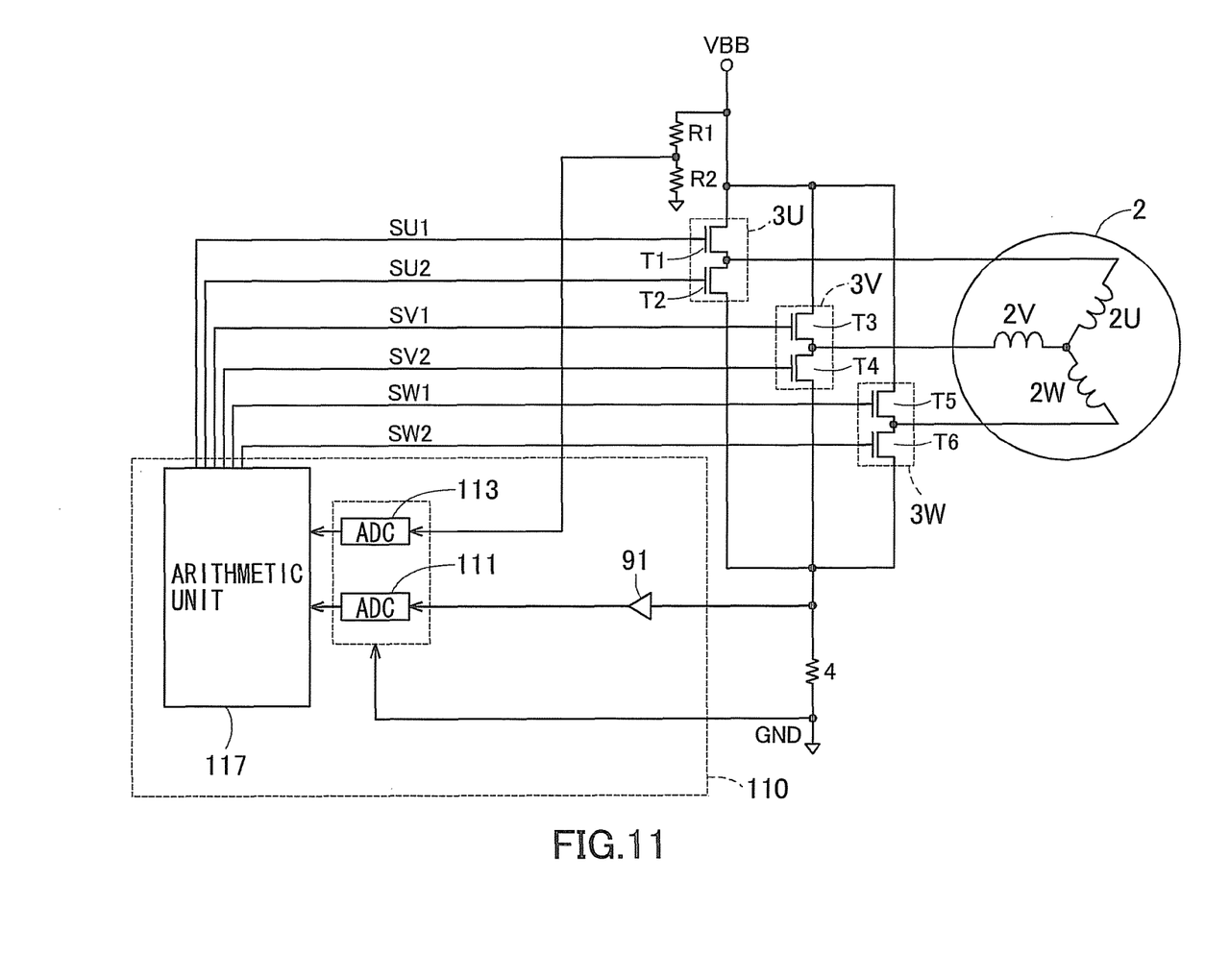
FIG. 11 is a schematic structural view of a motor system according to a third comparison example.

FIG. 11 shows a schematic configuration of a motor control device and a motor as the object to be controlled according to the third comparison example. The same reference numeral is given to the similar structural element of the motor control device and the motor according to the second embodiment shown in FIG. 9 and description thereof will not be repeated.

The motor control device 110 of the third comparison example includes an A/D converter 111 to perform A/D conversion on the output of the amplifier 91 and an A/D converter 113 to perform A/D conversion on the source voltage information.

Figure 12:
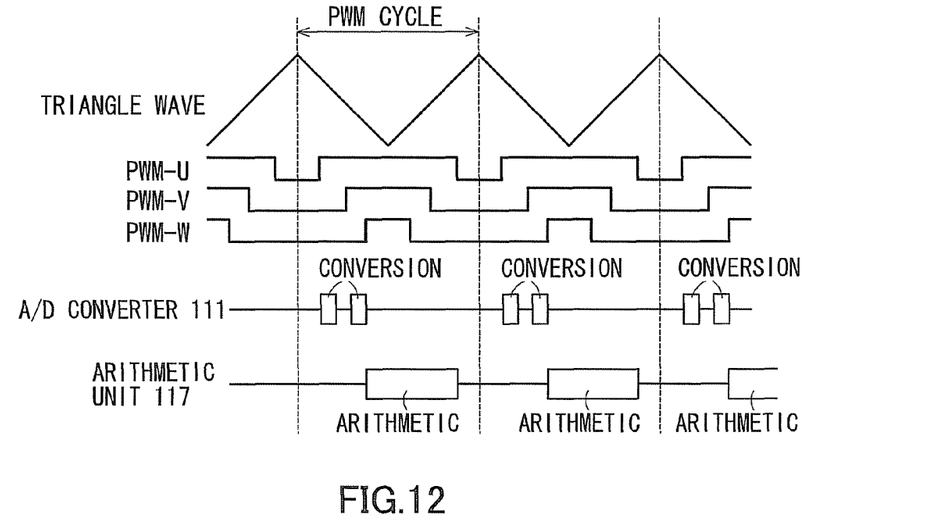
FIG. 12 is a timing chart showing an operation of a motor control device according to the third comparison example.

FIG. 12 shows a timing chart of operation of each part of the motor control device 110. The A/D converter 111 performs A/D conversion within a short time when the transistor T2 is kept OFF and the transistors T4 and T6 are kept ON and a short time when the transistors T2 and T4 are kept OFF and the transistor T6 is kept ON. Consequently, the A/D converter 111 is required to be an A/D converter which performs A/D conversion in high speed, so that the cost is increased.

On the other hand, in the motor control device 90 according to the second embodiment, the voltage generated at the shunt resistance is sequentially A/D converted once being sampled by the sample-hold circuit. Consequently, an A/D converter of lower speed than the A/D converter 111 can be adopted for the A/D converter 96, so that the cost can be reduced.

In this manner, in the motor control device 90 according to the present embodiment, the sample-hold circuits 93 and 94 sample and hold the voltage generated at the shunt resistance 4 in the same PWM switching period. The multiplexer 95 sequentially selects the held voltage information, and then, the A/D converter 96 performs A/D conversion in low speed. Therefore, the device cost can be decreased.

Third Embodiment

Figure 13:
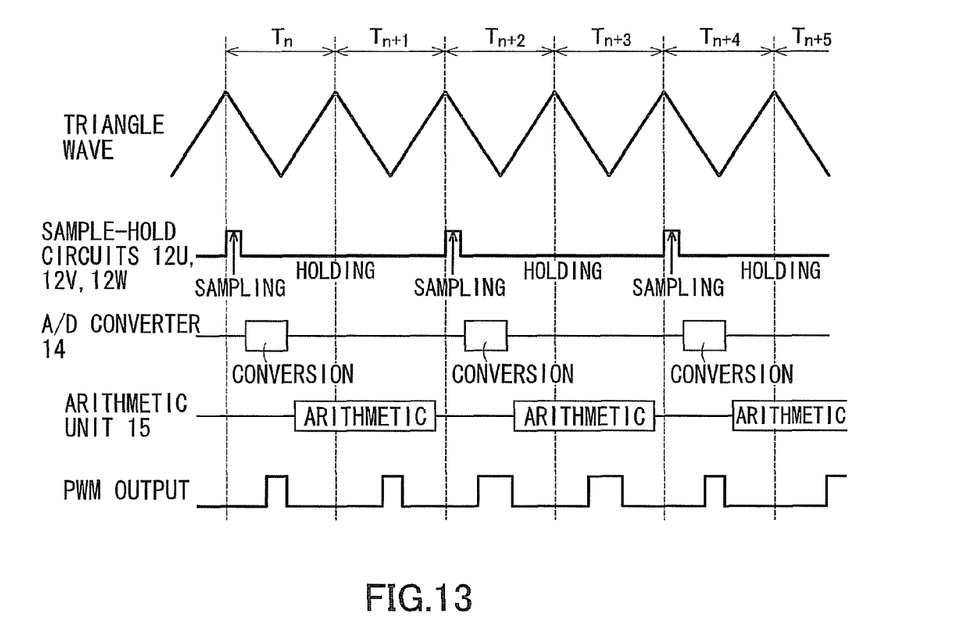
FIG. 13 is a timing chart showing an example of operation of a motor control device according to a third embodiment.

In the first and second embodiments, the sampling of the voltage generated at the shunt resistance, A/D conversion and arithmetic such as vector resolution are performed every one period of the PWM cycle. In the present embodiment, the above processes are performed over a plurality of periods. FIG. 13 shows an operation example of each part of the motor control device according to the present embodiment. Incidentally, the motor control device is to be the same configuration as the motor control device 1 shown in FIG. 1.

The sample-hold circuits 12U, 12V, and 12W sample the voltage values in accordance with the start of period $T_n$. Then, the A/D conversion by the A/D converter 14 and the arithmetic by the arithmetic unit 15 are performed at periods $T_n$ and $T_{n+1}$. The arithmetic result is reflected to the PWM signals at periods $T_{n+2}$ and $T_{n+3}$.

Similarly, the sample-hold circuits 12U, 12V, and 12W sample the voltage in accordance with the start of period $T_{n+2}$.

Then, the A/D conversion by the A/D converter 14 and the arithmetic by the arithmetic unit 15 are performed at periods $T_{n+2}$ and $T_{n+3}$. The arithmetic result is reflected to the PWM signals at periods $T_{n+4}$ and $T_{n+5}$.

In this manner, the A/D conversion by the A/D converter 14 and the arithmetic by the arithmetic unit 15 are performed over two periods of the PWM cycle. In addition, the PWM duty is adjusted every two periods.

Since the clock frequency can be deceased to a half compared to the case that the A/D conversion and the arithmetic such as vector resolution are performed every one period, the power consumption can be further decreased.

In the example of the above description, the A/D conversion and the arithmetic such as vector resolution are performed over two periods. However, it is also possible to perform over three or more periods.

Fourth Embodiment

Figure 14:
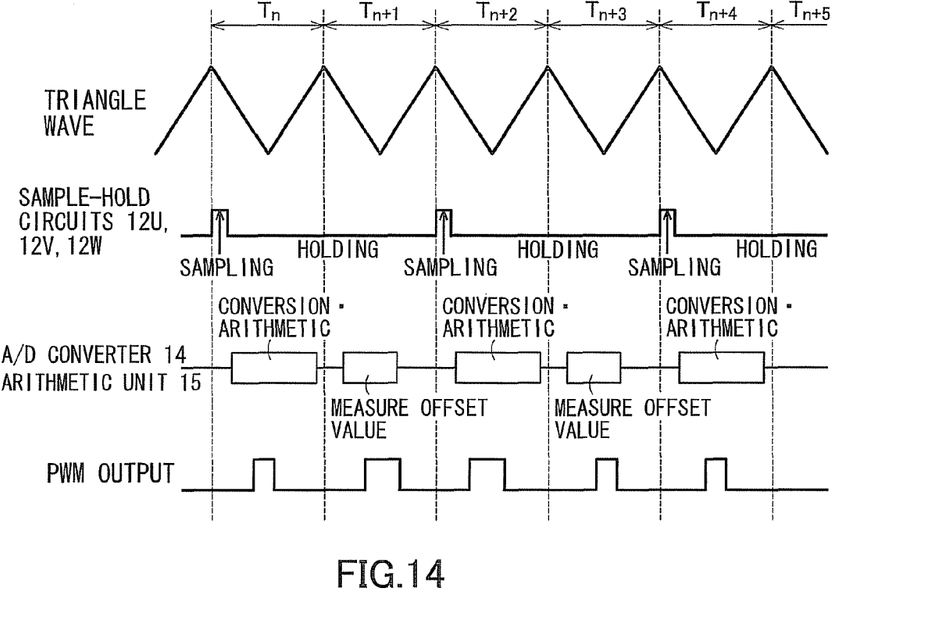
FIG. 14 is a timing chart showing an example of operation of a motor control device according to a fourth embodiment.

In the first and second embodiments, the sampling of the voltage generated at the shunt resistance, the A/D conversion and the arithmetic such as vector resolution are performed every one period of the PWM cycle. In the present embodiment, offset cancellation of analog circuits is performed at the next period after the above arithmetic and the like are performed. FIG. 14 shows an operation example of each part of the motor control device according to the present embodiment. Incidentally, the motor control device is to be the same configuration as the motor control device 1 shown in FIG. 1.

The sample-hold circuits 12U, 12V and 12W sample the voltage values in accordance with the start of period $T_n$. Then, the A/D conversion by the A/D converter 14 and the arithmetic by the arithmetic unit 15 are performed. The arithmetic result is reflected to the PWM signals at periods $T_{n+1}$ and $T_{n+2}$.

The arithmetic unit 15 measures the offset value of the analog circuits (i.e., the amplifiers 11U, 11V and 11W and the A/D converter 14) at period $T_{n+1}$.

Next, the sample-hold circuits 12U, 12V, and 12W sample the voltage values in accordance with the start of period $T_{n+2}$. Then, the A/D conversion by the A/D converter 14 and the arithmetic by the arithmetic unit 15 are performed. When the voltage value generated at the shunt resistance is acquired, the arithmetic unit 15 subtracts the offset value measured at period $T_{n+1}$ therefrom. Thus, the offset cancellation can be performed. The arithmetic result is reflected to the PWM signals at periods $T_{n+3}$ and $T_{n+4}$.

In this manner, performing the A/D conversion by the A/D converter 14 and the arithmetic by the arithmetic unit 15 and performing the offset measurement of the analog circuits are alternated every period of the PWM cycle.

Since the offset cancellation is performed by the arithmetic unit 15, it is not required to separately add a circuit such as an offset canceller. Consequently, the circuit area can be further decreased.

In the example of the above description, performing the A/D conversion and the arithmetic such as vector resolution and performing the offset measurement are alternated. However, the offset measurement may be performed once over a plurality of times (for example, one hundred times) of performing the A/D conversion and the arithmetic such as vector resolution. The arithmetic unit 15 can arbitrarily set the offset cancellation cycle in accordance with motor applications.

Figure 15:
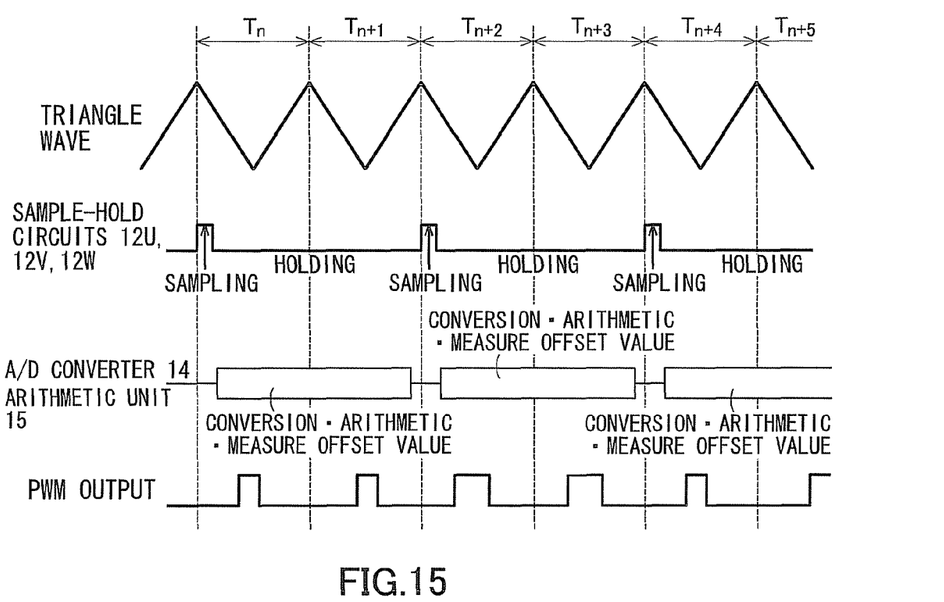
FIG. 15 is a timing chart showing an example of operation of a motor control device according to a modification.

In the example shown in FIG. 14, the A/D conversion by the A/D converter 14 and the arithmetic by the arithmetic unit 15 are performed within one period. However, the A/D conversion and the arithmetic may be performed over a plurality of periods. FIG. 15 shows an operation example of each part of the motor control device of this case.

The sample-hold circuits 12U, 12V, and 12W sample the voltage values in accordance with the start of period $T_n$. Then, the A/D conversion by the A/D converter 14 and the arithmetic by the arithmetic unit 15 are performed at periods $T_n$ and $T_{n+1}$. The arithmetic result is reflected to the PWM signals at periods $T_{n+2}$ and $T_{n+3}$.

While the above arithmetic is performed, the arithmetic unit 15 measures the offset value of the analog circuits, for example, in accordance with the start of period $T_{n+1}$.

Subsequently, the sample-hold circuits 12U, 12V, and 12W sample the voltage values in accordance with the start of period $T_{n+2}$. Then, the A/D conversion by the A/D converter 14 and the arithmetic by the arithmetic unit 15 are performed at periods $T_{n+2}$ and $T_{n+3}$. When the voltage value generated at the shunt resistance is acquired, the arithmetic unit 15 subtracts the offset value measured at period $T_{n+1}$ therefrom. Thus, the offset cancellation can be performed. The arithmetic result is reflected to the PWM signals at periods $T_{n+4}$ and $T_{n+5}$.

In this manner, the A/D conversion by the A/D converter 14 and the arithmetic by the arithmetic unit 15 are performed over two periods of the PWM cycle. Further, the offset value of the analog circuits is measured every two periods, so that the offset cancellation can be performed.

Since the clock frequency can be deceased to a half compared to the case that the A/D conversion and the arithmetic such as vector resolution are performed every one period, the power consumption can be further decreased. In addition, the offset cancellation can be performed without separately adding a circuit such as an offset canceller, so that the circuit area can be further decreased.

Figure 16:
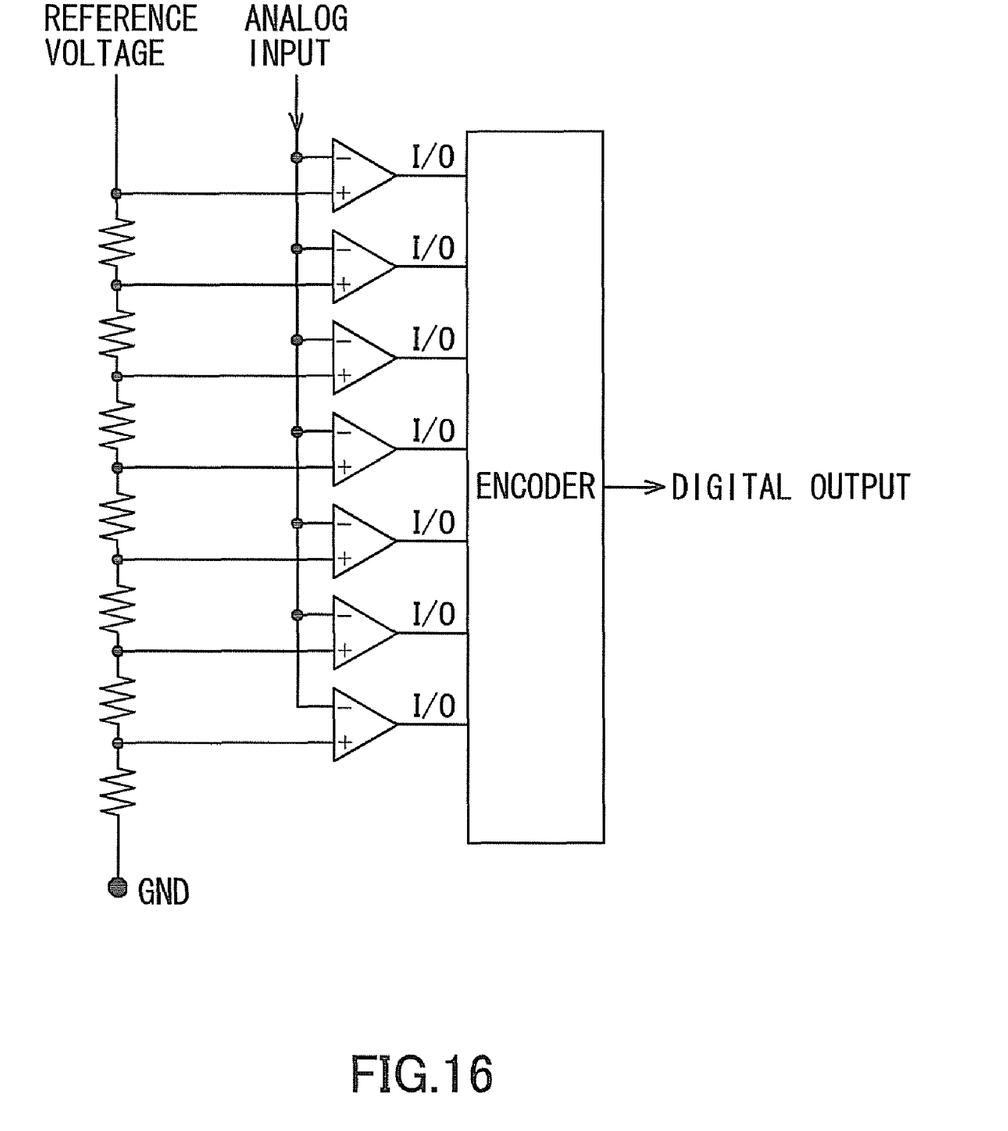
FIG. 16 is a schematic structural view of a flash type A/D converter.

In the first to fourth embodiments, the successive approximation type as shown in FIG. 6 is adopted as a configuration example of the A/D converter. However, another configuration may be adopted as well. For example, an A/D converter of a flash type shown in FIG. 16 may also be adopted. The circuit area of the motor control device according to the embodiments is to be decreased even if adopting such an A/D converter.

The motor control device according to the embodiments may further be provided with a diode temperature sensor. For example, the multiplexer 13 selects output of the diode temperature sensor at a ratio of the order of once in several hundred periods. Thus, the arithmetic unit 15 can detect the temperature within the device. For example, when temperature rising within the device is detected, it is considered that the clock frequency is decreased. Therefore, the clock generation circuit is controlled to increase the clock frequency generated.

The motor control device according to the embodiments can be adopted to every three-phase brushless motor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A motor control device, comprising:
 first to third amplifiers which amplify voltage generated at first to third shunt resistances connected to first to third drivers to supply driving current of each of three phases to a three-phase brushless motor;
 first to third sample-hold circuits which sample and hold voltage amplified by the first to third amplifiers;
 a multiplexer which sequentially selects and outputs voltage values held by the first to third sample-hold circuits;
 an A/D converter which performs A/D conversion on output signals of the multiplexer; and
 an arithmetic unit which calculates the driving current through an output signal of the A/D converter, estimates a magnetic pole position of the motor based on the driving current, and performs pulse width modulation, PWM, control on the driving current by controlling the first to third drivers.

2. The motor control device according to claim 1, wherein the first to third sample-hold circuits sample voltage amplified by the first to third amplifiers for every plural periods of the PWM control.

3. The motor control device according to claim 2, wherein the arithmetic unit performs arithmetic including calculation of the driving current, estimation of the magnetic pole position and control of the drivers during a plurality of periods of the PWM control.

4. The motor control device according to claim 2, wherein the arithmetic unit measures input offset of the first to third amplifiers for every plural periods of the PWM control and subtracts the amount of the measured input offset when calculating the driving current.

5. The motor control device according to claim 1, further comprising a temperature sensor which measures device temperature and outputs measurement result to the multiplexer, wherein the multiplexer selects the measurement result for every plural periods of the PWM control.

6. The motor control device according to claim 1, wherein the A/D converter is a successive approximation type A/D converter.

7. The motor control device according to claim 1, wherein the A/D converter is a flash type A/D converter.

8. A motor control device, comprising:
an amplifier which amplifies voltage generated at a shunt resistance connected to first to third drivers to supply driving current of each of three phases to a three-phase brushless motor;
first and second sample-hold circuits which sample and hold voltage amplified by the amplifier;
a multiplexer which sequentially selects and outputs voltage values held by the first and second sample-hold circuits;
an A/D converter which performs A/D conversion on output signals of the multiplexer; and
an arithmetic unit which calculates the driving current through an output signal of the A/D converter, estimates a magnetic pole position of the motor based on the driving current, and performs PWM control on the driving current by controlling the first to third drivers.

9. The motor control device according to claim 8, wherein the second sample-hold circuit performs sampling after the first sample-hold circuit performs sampling.

10. The motor control device according to claim 8, wherein the first and second sample-hold circuits sample voltage amplified by the amplifier for every plural periods of the PWM control.

11. The motor control device according to claim 10, wherein the arithmetic unit performs arithmetic including calculation of the driving current, estimation of the magnetic pole position and control of the drivers during a plurality of periods of the PWM control.

12. The motor control device according to claim 10, wherein the arithmetic unit measures input offset of the amplifier for every plural periods of the PWM control and subtracts the amount of the measured input offset when calculating the driving current.

13. The motor control device according to claim 8, further comprising a temperature sensor which measures device temperature and outputs measurement result to the multiplexer, wherein the multiplexer selects the measurement result for every plural periods of the PWM control.

14. The motor control device according to claim 8, wherein the A/D converter is a successive approximation type A/D converter.

15. The motor control device according to claim 8, wherein the A/D converter is a flash type A/D converter.

16. A motor system, comprising:
a rotor which includes a permanent magnet;
a stator which is arranged being opposed to the rotor and includes first to third coils connected being star-shaped;
first to third drivers which supply driving current to the first to third coils;
at least one shunt resistance which is connected to the first to third drivers;
at least one amplifier which amplifies voltage generated at the shunt resistance;
a plurality of sample-hold circuits which sample and hold voltage amplified by the amplifier;
a multiplexer which sequentially selects and outputs voltage values held by the plurality of sample-hold circuits;
an A/D converter which performs A/D converter on output signals of the multiplexer; and
an arithmetic unit which calculates the driving current through an output signal of the A/D converter, estimates a position of the rotor based on the driving current, and performs PWM control on the driving current by controlling the first to third drivers.

17. The motor system according to claim 16, wherein the shunt resistances, the amplifiers and the sample-hold circuits are provided three pieces each;
the kth, k is an integer of 1 to 3, shunt resistance is connected to the kth driver;
the kth amplifier amplifies voltage generated at the kth shunt resistance; and
the kth sample-hold circuit samples and holds voltage amplified by the kth amplifier.

18. The motor system according to claim 16, wherein one piece each of the shunt resistance and the amplifier and two pieces of the sample-hold circuits are provided; and
the second sample-hold circuit samples voltage amplified by the amplifier after the first sample-hold circuit samples voltage amplified by the amplifier.

19. The motor system according to claim 16, wherein the plurality of sample-hold circuits sample voltage amplified by the amplifier for every plural periods of the PWM control.

20. The motor system according to claim 19, wherein the arithmetic unit performs arithmetic including calculation of the driving current, estimation of the magnetic pole position and control of the drivers during a plurality of periods of the PWM control.

* * * * *